United States Patent [19]
Collet

[11] 4,426,842
[45] Jan. 24, 1984

[54] SYSTEM FOR HEAT RECOVERY FOR COMBUSTION MACHINE INCLUDING COMPRESSOR FOR COMBUSTION AIR

[75] Inventor: Peter J. Collet, Bunnik, Netherlands

[73] Assignee: Nederlandse Centrale Organisatie Voor Toegepast-Natuurwetenschappelijk Onderzoek, The Hague, Netherlands

[21] Appl. No.: 237,651

[22] Filed: Feb. 24, 1981

[30] Foreign Application Priority Data

Mar. 12, 1980 [NL] Netherlands .................. 8001472

[51] Int. Cl.³ .................................. F02C 7/10
[52] U.S. Cl. ............................ 60/39.511; 60/39.52; 60/390.53; 60/728
[58] Field of Search ............ 60/39.52, 39.51 R, 728, 60/39.05, 39.53, 39.59, 599; 415/168

[56] References Cited

U.S. PATENT DOCUMENTS

| | | |
|---|---|---|
| 2,678,531 | 5/1954 | Miller . |
| 2,863,282 | 12/1958 | Torell ...................... 60/39.53 X |
| 3,150,487 | 9/1964 | Mangan et al. ............. 60/39.18 B |
| 3,657,879 | 4/1972 | Ewbank et al. . |
| 3,731,485 | 5/1973 | Rudolph et al. ............ 60/39.53 X |
| 3,877,218 | 4/1975 | Nebgen ..................... 60/39.05 |
| 4,313,300 | 2/1982 | Wilkes et al. .............. 60/39.52 X |

FOREIGN PATENT DOCUMENTS

| | | |
|---|---|---|
| 717711 | 2/1942 | Fed. Rep. of Germany . |
| 276213 | 10/1964 | Netherlands . |
| 7009406 | 12/1971 | Netherlands . |
| 7607861 | 7/1976 | Netherlands . |

Primary Examiner—Louis J. Casaregola
Assistant Examiner—Donald E. Stout
Attorney, Agent, or Firm—Brumbaugh, Graves, Donohue & Raymond

[57] ABSTRACT

System for waste heat recovery, comprising a combustion machine (2,3) with a compressor (4) for the combustion air (30) and means (7) like a heat exchanger (13) and/or a recirculation duct (14), to transfer heat, contained in the combustion gases (37,38,39) after their expansion in the machine (3), to the combustion air flow (33) before its entry into the compressor (4). Water (8,8') is introduced into the (to be) heated combustion air flow (30,33) cooling it by its evaporation, and the vapor is partially condensed again in a cooler (6) fitted in the compressed flow (34) after leaving the compressor (4). The condensation can take place at higher temperature, thus the system acts as heat pump for the waste heat. The compressed air flow (35) enters extra cooled into the combustion chamber (2) which provides an additional advantage. For the compressor (4), combustion chamber (2) and turbine (3) a normal gas turbine may be used.

15 Claims, 3 Drawing Figures

SYSTEM FOR HEAT RECOVERY FOR COMBUSTION MACHINE INCLUDING COMPRESSOR FOR COMBUSTION AIR

This invention relates to a system for heat recovery comprising a combustion machine and a compressor for the combustion air, in which part of the waste heat contained in the combustion gases after their expansion in the machine, is returned with recovery means into the combustion air flow.

With combustion machines, like a gas turbine fitted with a compressor for compression of the combustion air, a combustion chamber and an expansion turbine for the combustion gases, it is known to increase the thermal efficiency of the machine by returning part of the waste heat contained in the exhaust gases after leaving the turbine, into the combustion air. In known systems this is done by making use of a regenerative or recuperative heat exchanger, which transmits part of this heat to the air flow leaving the compressor and/or an exhaust gas boiler which transmits heat at a useful temperature level to a separate coolant flow which forms part of a heat utilization system. In such known systems, it is only possible to recover part of the waste heat in this way. With larger gas turbine installations, in case of that, usually the exhaust gases are led through an exhaust gas boiler, but also this boiler is for the same reasons only able to recover parts of the waste heat on a useful temperature level in a separate cooling circuit. In both cases the temperature of the combustion gases after leaving the heat exchanger still is so high, that not only a certain quantity of sensible heat is lost, but also a quantity of latent heat in the form of not yet condensed water vapor. In case the temperature of the cooling fluid is sufficiently low, this can be improved by introduction of a next heat exchanger, in which condensation of the water vapor takes place, but this limits in practice the fuel used to a type which creates no corrosive combustion products and which furthermore requires a complete and, more specially, a sootless combustion under all circumstances. In practice only natural gas meets these requirements. With the system described above for the recovery of heat, the temperature of the air supplied to the combustion chamber is so high, that a considerable quantity of nitrogen oxides (NOx) is formed, which quantity should however gradually be reduced in future for reasons of enviroment-protection.

Reduction of the heat losses and partially meeting of the environmental-hygienic objections, are provided by recirculating part of the exhaust gases and by introducing them, mixed with the combustion air, to the inlet of the compressor. However, in doing so, the power supply capacity of the installation is reduced considerably and the power supply efficiency of the gas turbine as well, due to the high inlet temperature at the compressor. For said reasons this method is hardly applied in practice.

The invention aims to increase the rate of heat recovery from the exhaust gases, avoiding the usual loss of power supply capacity and efficiency when using the above described system. Furthermore the invention is not confined to the exclusive use of gas turbines, but other combustion machines as well can be used, like for instance a reciprocating gas engine with internal combustion.

According to the invention the system, as described above, is characterized in that said waste heat is transferred into the combustion air flow before its entry into the compressor, in that a cooler is placed in the combustion air flow after having left the compressor and before entering into the combustion machine, in that ahead of the inlet of the compressor water is introduced in the preheated and/or to be preheated combustion air flow, and in that in the cooler the air-water vapor mixture is cooled, whereby at least part of the water vapor condenses.

Against general practice a greater part of the waste heat is, according to the invention, supplied to the combustion air flow before its enters in the compressor. The introduction of waste heat in the combustion air flow can, as described above, take place with the help of a recirculation flow of exhaust gases and/or with the help of a heat exchanger between the exhaust gases and the entering combustion air. Into said heated inlet air flow water is introduced and evaporated in such quantities, that the temperature of the air-vapor mixture falls to values corresponding with a condition of saturation for the water vapor present in the air, resulting in a reduction of the driving power required for the compressor, although the mass flow is somewhat increased due to the introduction of the water. In the cooler which is placed, according to the invention, in the combustion air flow after its exit from the compressor, a part of the water vapor contained in the mixture, condenses. Due to the fact that said cooling takes place at increased pressure, the condensation of the water vapor can take place at considerable higher temperature as well, so that the waste heat taken from the exhaust gases, and transported in latent form by the water vapor is recovered in the cooling fluid led through said heat exchanger at a considerably higher temperature level. The process adopted therefore is comparable with that of a heat pump, in this case however not the environment but the exhaust gases acting as heat source. In this way almost all sensible and latent heat contained in the exhaust gases can be recovered without the temperature of the cooling fluid playing a basically limiting role with this process. In case exhaust gases are recirculated, the oxygen contents of the combustion air will be reduced, resulting in the aimed reduction of the NOx production as well. The reduced temperture of the combustion air entering the combustion chamber acts accordingly. The higher the compression ratio of the compressor, the higher will be the temperature level on which the waste heat can be recovered with the cooling fluid.

It is already known, that an air compressor, more specially of the rotating type, is very sensitive to deposits on the vanes, resulting in an appreciable decrease of the efficiency. In general the aspirated ambiant air should therefore be filtered effectively; this is even more true in case a circulation flow of combustion gases is used, which might contain combustion products like soot. The introduction of water into the suction air flow of the compressor, can be used at the same time as effective washing process of said air flow. Part of the water evaporates and is carried along, another part, with the washed out foreign particles, can be filtered in a separate water circuit, neutralized and recirculated, in order to avoid heat losses. Attack by corrosion in the condensing-part of the cooler can be reduced as well.

Together with the compressor a combustion machine may form a gas turbine of known type, in which the combustion takes place in a separate combustion chamber and the expansion of the compressed combustion gases takes place in a turbine. Said turbine may drive the compressor and the generally available over-power of the turbine may be used to drive for instance a generator, a heat pump or so. In view of the fact that the installation according to the invention is able to recover a greater part of the waste heat contained in the exhaust gases at a comparative high temperature level and in a simple way, said installation can be considered to be extraordinary well suited for cooperation with a heat pump, which aims for the same.

According to a preferred embodiment of the installation according to the invention, the compressor can consist of two stages, in which case the cooler discussed above, can be installed between the first and the second stage. This can or cannot be combined with an equivalent second cooler after the second compressor stage and with recuperation of heat form the exhaust gas flow towards the combustion air flow after the secoond compressor.

Finally it should be remarked, that the expansion of the combustion gases may take place in a multistage turbine as well, in which case the first turbine stage may drive the compressor, a second turbine stage a second compressor stage and eventually a third turbine stage the driven machine, like a generator or heat pump. The third turbine stage can in the latter case be considered as power turbine, for which the earlier mentioned part of the installation will function as gas generator. The turbine therefore, can be of a single shaft-, twin shaft- or triple shaft-design, as is known in itself within expert circles.

According to another characteristic of the invention, the combustion machine may also consist of a reciprocating internal combustion engine, in which the combustion and the expansion takes place in the same space, i.e. the cylinders. The compressor then acts to provide for the pressure charging of the engine and is therefore installed in the circuit of the combustion air according to the invention. In doing so it is possible to drive the compressor with mechanical means by the engine, but part of the expansion taking place in the cylinders, may be taken over by an exhaust gas turbine, which could drive in its turn the compressor. In the latter case the combustion machine with compressor forms a well known internal combustion engine with pressure charging compressor driven by an exhaust gas turbine. The engine itself provides the mechanical power for external drives, like a generator, heat pump or so.

It will be evident, that the compressor of the system can be a flow-machine. Under certain circumstances however, also a reciprocating compressor can be used or each other known type of air compressor, like a Roots type compressor, a screw type compressor or so.

Typical embodiments of the system according to the invention are illustrated in the accompanying drawings, which will be explained below.

In all three figures corresponding parts are indicated with the same numerals. The numerals from 30 and higher are concerned with both physical parts with which a circuit is constructed, like pipes, valves, etc as well as with the fluid-flows transported through these circuits.

Figure 1:
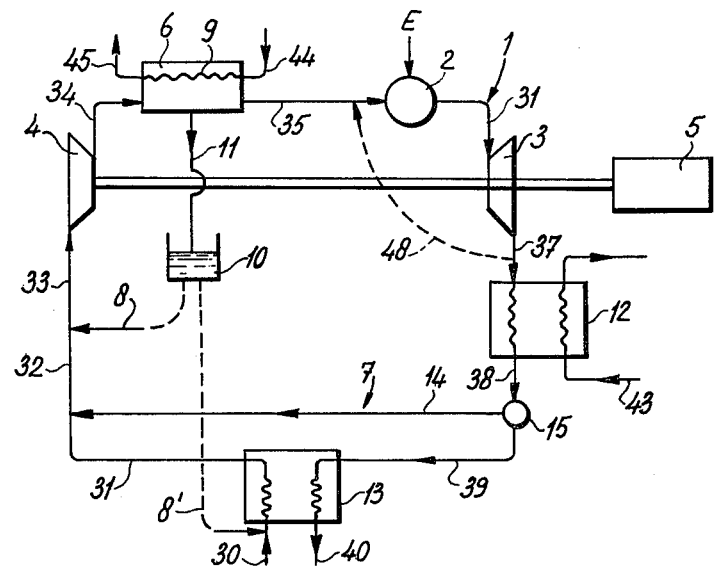
FIG. 1 illustrates schematically an installation according to the invention, making use of a simple single stage gas turbine.
Figure 2:
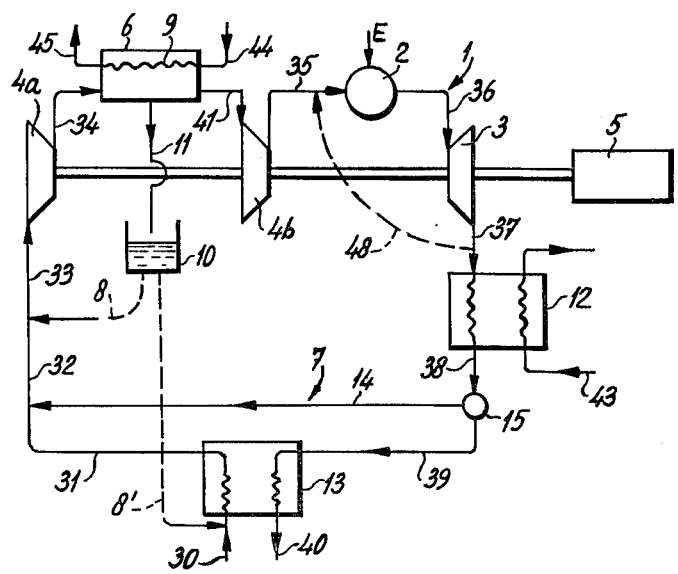
FIG. 2 illustrates an installation making use of a gas turbine with two stage-compression.
Figure 3:
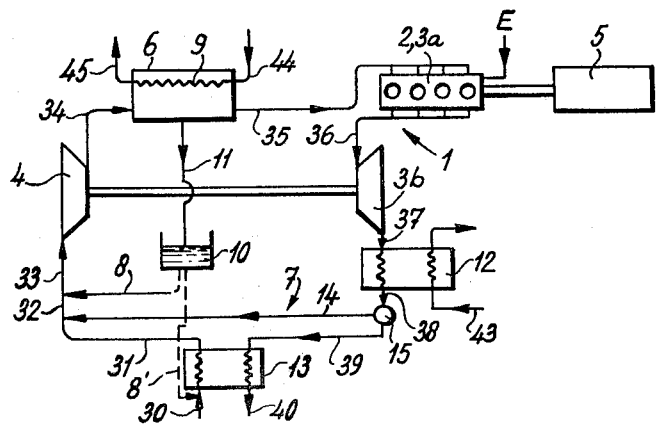
FIG. 3 illustrates the application of the installation according to the invention making use of an internal combustion engine with turbo-pressure charging, driven by the exhaust gases of the engine.

As a whole, the combustion machine is indicated with 1, which machine does consist according to FIGS. 1 and 2 of a separate combustion chamber 2 and an expansion turbine 3. The embodiment according to FIG. 3 shows a combustion machine consisting of an internal combustion engine, like for instance a gas engine 2, 3a, in which both combustion and part of the expansion take place, whereas the remaining part of the expansion takes place in an expansion turbine 3b. Compressor 4 does consist, according to FIG. 2 of a first stage 4a and a second stage 4b. The mechanical drive between the compressor 4, 4a, 4b and the driving turbine 3, 3b is schematically indicated in all figures. The driven machine is indicated with 5, which may be a generator, a heat pump, or so and which is driven according to FIGS. 1 and 2 by the expansion turbine 3 and according to FIG. 3 by the internal combustion engine 2, 3a. To keep a system according to the invention running energy E has to be supplied to the combustion air in the combustion chamber 2, respectively 2, 3a. This energy can be supplied in the form of a fuel, like natural gas or fluid fuel, but it is also conceivable to supply energy in the form of heat by external heating the chamber 2, which will be built like a heat exchanger in this case (FIG. 1 and 2). It may be remarked that in the latter case in principle also a gas turbine with closed circuit may be applied, to which the idea behind the invention is applicable as well. The fluid in the closed circuit does not need to be air. The exhaust flow 38 could in that case be returned in total through conduct 14 to the inlet conduct 32.

Between the compressor 4, 4a and the combustion space 2, a cooler 6 is installed in the circuit 34, 35 for the combustion air. The combustion air is cooled in said cooler 6. The recovery means to transport the waste heat from the combustion gases 37, 38 after their expansion in the turbine 3, are generally indicated with 7. The recovered heat is brought by the recovery means 7 into the aspirated combustion air 30,31 in which water 8, 8' is introduced. The water 8, 8' evaporates in the heated combustion air 31, 32, cooling it, after which the air plus the water vapor 33 is compressed in the compressor 4, 4a, 4b and the water vapor in the compressed mixture 34 condenses subsequently on the cooler pipes 9 in the cooler 6. The condensate flows through conduct 11 into a condensate tank 10.

Generally an installation according to the invention will be fitted with an exhaust gas boiler 12, which provides for a first cooling of the expanded combustion gases 37. The gases generally have a temperature of several hundreds degrees centigrade, so that an effective heat recovery in the exhaust gas boiler 12 may take place, for instance by producing steam under pressure or by heating a cooling fluid flow 43 to such temperature level, that it may be effectively used elsewhere.

Furthermore heat from the combustion gases 37 as they leave the turbine, may be directly recovered by a known recuperator, and transferred to the combustion air flow 35 before the combustion chamber 2. This possibility of recuperation is schematically indicated with the dotted line 48 in FIGS. 1 and 2.

The heat recovery means 7 may consist of a further heat exchanger 13 and/or of a recirculation duct 14. With a directional valve 15 the exhaust gas flow 37, 38 can be divided at will over the recovery means 13 and 14. It may be remarked however, that never all exhaust gases may be recirculated by duct 14, since soon a shortage of oxygen would occur in the flow of combustion air 35 for the combustion space. Recirculation 14 could however be omitted. In general an exhaust gas boiler 12 is dimensioned such, that no condensation of combustion products, like water vapor will occur in this boiler. This means that the exhaust gases 39 as they enter the heat exchanger 13, contain both sensible and latent heat, compared to normal ambient conditions into which the combustion gases 40 finally are emitted. The heat exchanger 13 therefore will be dimensioned such, that a greater part of the latent heat can be recovered and transmitted to the aspirated combustion air 30. In order to transmit as much as possible of both the sensible and the latent heat contained in the exhaust gases 39 to the inlet air flow 30, the introduction of water (8') in the inlet flow 30 may take place ahead of or in the heat exchanger 13.

The combustion air 30 is preheated in the last mentioned heat exchanger 13 and may subsequently be mixed (33) with the recirculation flow 14 of the exhaust gases and thus is brought to an undesirably high temperature for introduction in the compressor 4, 4a. The combustion air flow 33 contains an appreciable amount of heat recovered from the exhaust gases, which otherwise would be lost, because the temperature level of the exhaust gas flow 38, 39 is too low for all practical direct applications. The supplied water 8, 8' looks after further transport of this heat in latent form.

The embodiment according to FIG. 2 contains a two stage compressor 4a, 4b, both driven by the same turbine 3. Between said both stages the cooler 6 is positioned in the air flow 41, which apart from transmitting the sensible and latent heat to the cooling circuit 44, 45, also functions to reduce the entry temperature 41 of the second compressor stage 4b, in order to reduce the required driving power for said stage and to increase accordingly the power supply capacity and the efficiency. Depending from the primary application of the system, i.e. the supply of mechanical driving power with integrated recovery of waste heat or the supply of as much heat on a useful temperature level as possible with minimum supply of a fuel, also subsequent coolers 6 may be installed after the following compressor stages, of which at least one is adapted for condensation.

In addition it may be pointed out that in case a small gas turbine with a power output of several hundreds of kilowatts is used, the pressure ratio over the compressor 4 amounts to about 8 and that the entry temperature of the water vapor-air mixture, which has recovered both the sensible and latent heat from the exhaust gases 39 in the heat exchanger 13, at the compressor will be in the range between 40° C. and 50° C. In the cooler 6 condensation of vapor in the compressed water vapor-air mixture 34 occurs under these circumstances at a cooling fluid temperature in the circuit 44, 45 of about 65° C. Therefore as long as the cooling fluid in the circuit 44, 45 is below 65° C., it is possible to recover the latent heat stored in the air flow 34, which has been recovered in the heat exchanger 13. In case of larger installations, as illustrated in FIG. 2, with a pressure ratio of compressor 4a of about 4, the entry temperature to this compressor will be about 50° C., so that under these circumstances condensation occurs at a cooling fluid temperature in the circuit 44, 45 of about 60° C. In case the installation is according to FIG. 3, fitted with a pressure charger driven by an exhaust gas turbine forming part of the internal combustion engine, the pressure ratio of compressor 4 will be about 2.5 with an entry temperature to the compressor of about 60° C. Under these conditions the condensation temperature of the cooling circuit 44, 45 in cooler 6 amounts to about 65° C. This can be compared with the temperature of the exhaust gases in flow 38 after leaving the exhaust gas boiler which are generally between 100° C. and 150° C. and in which flow condensation of the major part of the water vapor only occurs at cooling water temperatures below approximately 45° C. thereby rendering it difficult to recover the stored latent heat in the exhaust gases. Thanks to the invention a recovery temperature in an other medium than the exhaust gases is possible, which temperature is at minimum about equal to this, but which also may be appreciably higher (approx. 60° C. to 65° C.), depending from the type of system used.

Finally it can be pointed out, that the heat transfer in the cooler 6 is considerably higher than in a normal inter- or after cooler, because in the humid conditions in the cooler element with its wet walls the convective heat transfer is greatly increased compared to the convective heat transfer under the conditions of a dry cooler element.

I claim:

1. In a system for generating power including a combustion machine and a compressor for compressing incoming combustion air, in which exhaust gases after their expansion in the combustion machine contain both sensible heat and latent heat of vaporization in the form of water vapor, means for recovering heat from said exhaust air compressing means for transferring both latent heat and sensible heat from said exhaust gases to said incoming combustion air before its entry into said compressor and for storing at least a portion of the transferred heat as latent heat, in the form of vaporized water, in said incoming combustion air, and means, arranged between said compressor and said combustion machine, for removing stored latent heat from said combustion air for use in another system, comprising a condensing cooler means for condensing at least a part of the water vapor.

2. A system according to claim 1, wherein the means for transferring and storing waste heat from said combustion gases to the incoming combustion air comprise a heat exchanger, means for directing said incoming combustion air and said exhaust gases through said heat exchanger, and means operable with said heat exchanger to transfer sensible and latent heat within said heat exchanger.

3. A system according to claim 2, wherein the means operable with said heat exchanger comprise means for introducing water into said incoming combustion air prior to leaving said heat exchanger such that said water is vaporized in said heat exchanger, to absorb heat and thereby facilitate transfer of waste heat to said incoming combustion air.

4. A system according to claim 2, wherein the means operable with said heat exchanger comprise means for introducing water into said incoming combustion air in said heat exchanger such that said water is vaporized in said heat exchanger, to absorb heat and thereby facilitate transfer of waste heat to said incoming combustion air.

5. A system as defined in claim 1, wherein the means for transferring heat comprises means for recirculating a portion of said exhaust gases into said incoming combustion air, and means for introducing water for vaporization by heat from said recirculated gases.

6. A system as defined in claim 3, wherein the means for transferring heat comprises means for recirculating a portion of said exhaust gases into said incoming combustion air, and means for introducing water for vaporization by heat from said recirculated gases.

7. A system as defined in claim 4, wherein the means for transferring heat comprises means for recirculating a portion of said exhaust gases into said incoming combustion air, and means for introducing water for vaporization by heat from said recirculated gases.

8. A system according to claim 1, wherein said compressor and said combustion machine together form a gas turbine.

9. A system according to claim 8, wherein said compressor is the first compressor stage of at least two compressor stages, and wherein said cooler is installed between the first compressor stage and the next compressor stage.

10. A system as defined in claim 1, wherein said combustion machine is in the form of a reciprocating internal combustion engine, and wherein said compressor serves to pressure charge said engine.

11. A system as defined in claim 3, wherein said combustion machine is in the form of a reciprocating internal combustion engine, and wherein said compressor serves to pressure charge said engine.

12. A system as defined in claim 4, wherein said combustion machine is in the form of a reciprocating internal combustion engine, and wherein said compressor serves to pressure charge said engine.

13. A system as defined in claim 11, wherein said combustion machine is in the form of a reciprocating internal combustion engine, and wherein said compressor serves to pressure charge said engine.

14. A system as defined in claim 6, wherein said combustion machine is in the form of a reciprocating internal combustion engine, and wherein said compressor serves to pressure charge said engine.

15. A system as defined in claim 7, wherein said combustion machine is in the form of a reciprocating internal combustion engine, and wherein said compressor serves to pressure charge said engine.

* * * * *

UNITED STATES PATENT AND TRADEMARK OFFICE
CERTIFICATE OF CORRECTION

PATENT NO. : 4,426,842
DATED : January 24, 1984
INVENTOR(S) : Peter J. Collet

It is certified that error appears in the above-identified patent and that said Letters Patent is hereby corrected as shown below:

Column 3, line 17, "secoond" should read -- second --;

Column 6, line 33, "compressing" should read -- comprising --;

Column 8, line 11, "claim 11" should read -- claim 5 --.

Signed and Sealed this

Fifth Day of March 1985

[SEAL]

Attest:

DONALD J. QUIGG

Attesting Officer     Acting Commissioner of Patents and Trademarks